Dec. 5, 1944.  A. ZADEK  2,364,581
RATTLE
Filed Feb. 17, 1942
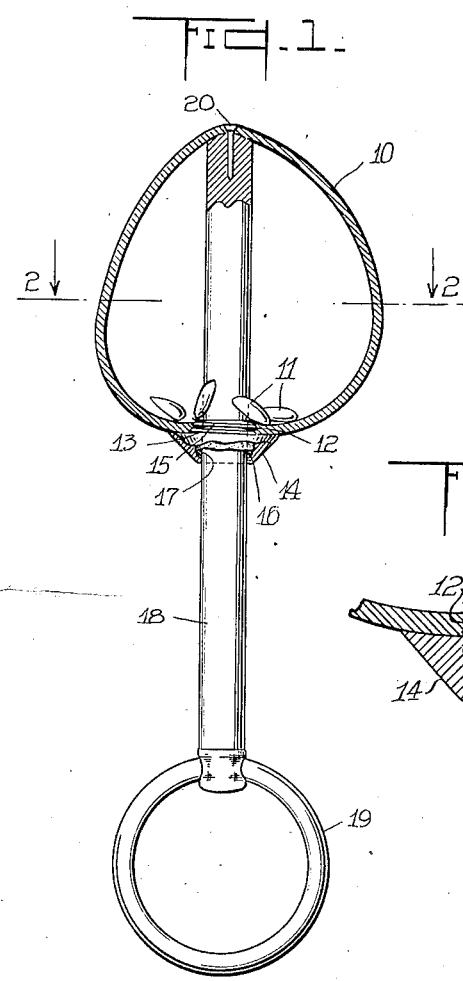
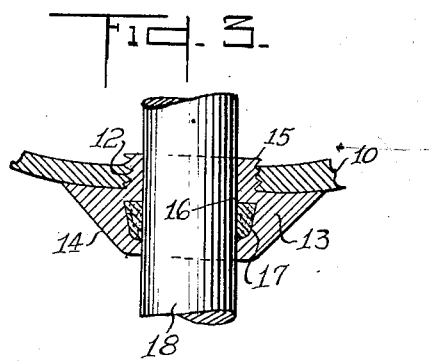
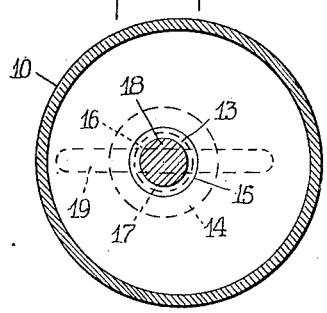
ARTHUR ZADEK
INVENTOR
BY
his ATTORNEY.

Patented Dec. 5, 1944

2,364,581

UNITED STATES PATENT OFFICE 2,364,581

RATTLE

Arthur Zadek, New York, N. Y., assignor to Zadek-Feldstein Co., Inc., New York, N. Y., a corporation of New York Application February 17, 1942, Serial No. 431,190

2 Claims. (Cl. 46—193)

My invention relates to a nursery toy in the form of a rattle which is made of a dried gourd in combination with a novel handle therefor.

Rattles are usually made of some variety of plastic or rubber head with a handle member mounted in the head by means of which the rattle is supported and made to operate. Because of more urgent demands being made on plastics and rubber, it is not permitted to utilize these materials in the construction of rattles. In the search for a substitute it was discovered that a small variety of gourd could be used as a rattle head providing a suitable anchor could be devised which would insure a rigid connection for a handle. Accordingly, a novel handle was sought, which would meet the demands of the ordinary handle, and which could be permanently anchored in the thin, brittle sheet of the dried gourd.

Therefore, the present invention has for its object to provide a combination dried gourd and handle therefor, which will have the appearance and function of any ordinary toy rattle and which will include novel anchoring means for the handle.

With the foregoing object in view and others which will appear as the description proceeds, the invention comprises the various novel features of construction and arrangement of parts which will be set forth in the specification and claims and illustratively exemplified in the accompanying drawing, in which:

Figure 1 is a substantially longitudinal sectional view of a rattle according to the present invention and Figure 2 is a substantially transverse sectional view of the same taken on lines 2—2 of Figure 1.

Figure 3 is an enlarged sectional view showing the connecting means used to attach the handle to the gourd.

Referring to the drawing, 10 denotes the rattle head which consists of a gourd in which the interior has dried and the seeds 11 have loosened. The gourd in its dried state comprises a third hard shell which may be of various shapes. The varieties best suited for the present purpose are those known as apple-shaped, orange and pear-shaped, because they come in relatively small sizes and are particularly light in weight. The exterior of the shell lends itself well to decorations ordinarily applied to rattles.

At the point on the surface of the gourd preferably where the stem of the vine is detached, an opening 12 is made to accommodate a socket 13 which comprises a tapered outer ferrule portion 14, exteriorly threaded stem 15 to screw into the opening 12 and an axial bore 16. The bore 16 of the socket 13 is provided with an enlarged portion 17 to receive an adhesive. Arranged in the socket 13 is a handle 18 which comprises a rod of either rigid or flexible material. The rod is preferably of sufficient length to project through the bore 16 of the socket 13, abut the inner surface of the gourd shell opposite the opening 12 and still have a sufficient portion projecting beyond the socket outside the gourd to provide a suitable grip portion. The handle 18 is anchored in the socket 13 by placing an adhesive in the enlarged portion of the bore 16, which adhesive firmly attaches the handle in position with its inner end tightly pressed against the inside of the shell. The outer end of the handle carries a teething ring 19.

If desirable, it is possible to permanently attach the inner end of the handle 18 to the inner surface of the gourd shell. A practical means of making the attachments is by driving a pin 20 through the shell into the adjacent end of the rod. In accordance with the present construction the rod or handle 18 is attached to the shell of the gourd at two spaced points, thereby giving a strong connection not likely to give way under vigorous handling.

Having now described my invention, what I claim and desire to secure by Letters Patent is:

1. A rattle comprising a hollow gourd which has been dried to a hard shell containing loose seeds, said shell being provided with an opening, an axially bored socket comprising an externally threaded portion to screw into the opening and a flange to abut the surface of the shell, a handle comprising a rod projecting through the bore of said socket, said bore being provided with an enlarged portion embracing the rod, and an adhesive in said enlarged portion to attach the rod permanently to the shell.

2. A rattle, as claimed in claim 1, in which the rod projects through the socket and abuts the opposite inner surface of the shell.

ARTHUR ZADEK.